DUPLEX DATA TRANSMISSION SYSTEM UTILIZING A TELEPHONE CHANNEL

Filed Jan. 23, 1961 2 Sheets-Sheet 1

Inventor
E.P.G.Wright-V.J.Terry-
W.F.S.Chittleburgh
By [signature]
Attorney

Dec. 28, 1965 E. P. G. WRIGHT ETAL 3,226,480

DUPLEX DATA TRANSMISSION SYSTEM UTILIZING A TELEPHONE CHANNEL

Filed Jan. 23, 1961 2 Sheets-Sheet 2

Inventor
E.P.G.Wright-V.J.Terry-
W.F.S. Chittleburgh
By [signature]
Attorney 3,226,480

DUPLEX DATA TRANSMISSION SYSTEM UTILIZING A TELEPHONE CHANNEL

Esmond Philip Goodwin Wright, Victor John Terry, and William Francis Sidney Chittleburgh, all of London, England, assignors to International Standard Electric Corporation, New York, N.Y.

Filed Jan. 23, 1961, Ser. No. 84,073
Claims priority, application Great Britain, Jan. 21, 1960, 2,178/60
11 Claims. (Cl. 179—15)

This invention relates to apparatus and systems for intelligence transmission over communication channels of limited frequency bandwidth, such as the speech channels of the telephone network, and has particular reference to the transmission of data over such channels.

For the purposes of this specification "data" is defined as intelligence which is capable of being coded in digital form and which is not degraded when stored for appreciable periods of time or when transmitted at varying rates. "Data" is thus contrasted with the type of speech signal carried by a telephone channel. It includes the type of intelligence carried by a telegraph channel, and also, with greater relevance to present-day conditions, to the primarily numerical intelligence suitable for the control of, or for entry into, automatic calculating or "data processing" equipment.

The telephone network, both inland and international, has for many years been employed for the transmission of messages in telegraph code form by the use of voice-frequency telegraphy. A large number of distinct telegraph channels of this type can be modulated into a single telephone channel of normal bandwidth. The terminal equipment in such cases has been constituted by automatic transmitters and receiving teleprinters operating at speeds up to, in general, no more than 100 bauds, and more usually 50–75 bauds. These speeds are relatively slow when compared with those attainable by other more recent forms of data handling equipment. The economical use of high-speed data processing machines is likely to involve the transmission of data from remote stations to a computing center over the existing communication network and this transmission cannot be effected by normal teleprinter operation because this would constitute a serious form of delay.

In its most general form the present invention consists in apparatus for intelligence transmission including first and second terminal equipments connected or capable of being connected to each other over a single communication channel of limited frequency bandwidth and arranged so that when so connected they provide for simultaneous intelligence transmission in both directions over the channel, each terminal equipment including means for dividing the channel bandwidth into two sub-channels of unequal bandwidth with the sub-channel of greater bandwidth being allocated to the transmission direction which carries the greater proportion of the total traffic over the channel. The transmission speeds employed over each sub-channel are preferably chosen in accordance with the relative rates of transmission in each direction and with the bandwidths of the sub-channels.

According to a feature of the invention, the terminal equipments are so arranged that transmission in one direction (the forward direction) consists primarily of useful intelligence and occurs over the sub-channel of greater bandwidth and transmission in the reverse direction consists primarily of supervisory intelligence.

In the preferred embodiment of the invention, the terminal equipments are adapted for the transmission of data over a communication channel having the bandwidth of a channel of the telephone network. Switching means associated with each equipment may then be arranged to connect at will either the said equipment or telephone subscriber's apparatus to the channel termination.

The preferred form of the invention thus provides apparatus for data transmission in which the use of a telephone speech channel instead of a narrow-band telegraph channel can provide a much higher transmission speed. An even wider bandwidth would permit the use of transmission speeds corresponding to the handling speeds of the more advanced forms of data processing equipment, but this advantage would be offset by the fact that transmission could no longer be effected over single channels of the existing telephone network.

The foregoing and other features of the invention will be evident in the following description of apparatus for data transmission over the telephone network embodying the invention in its preferred form. The description refers to the accompanying drawings, in which.

Figure 1:
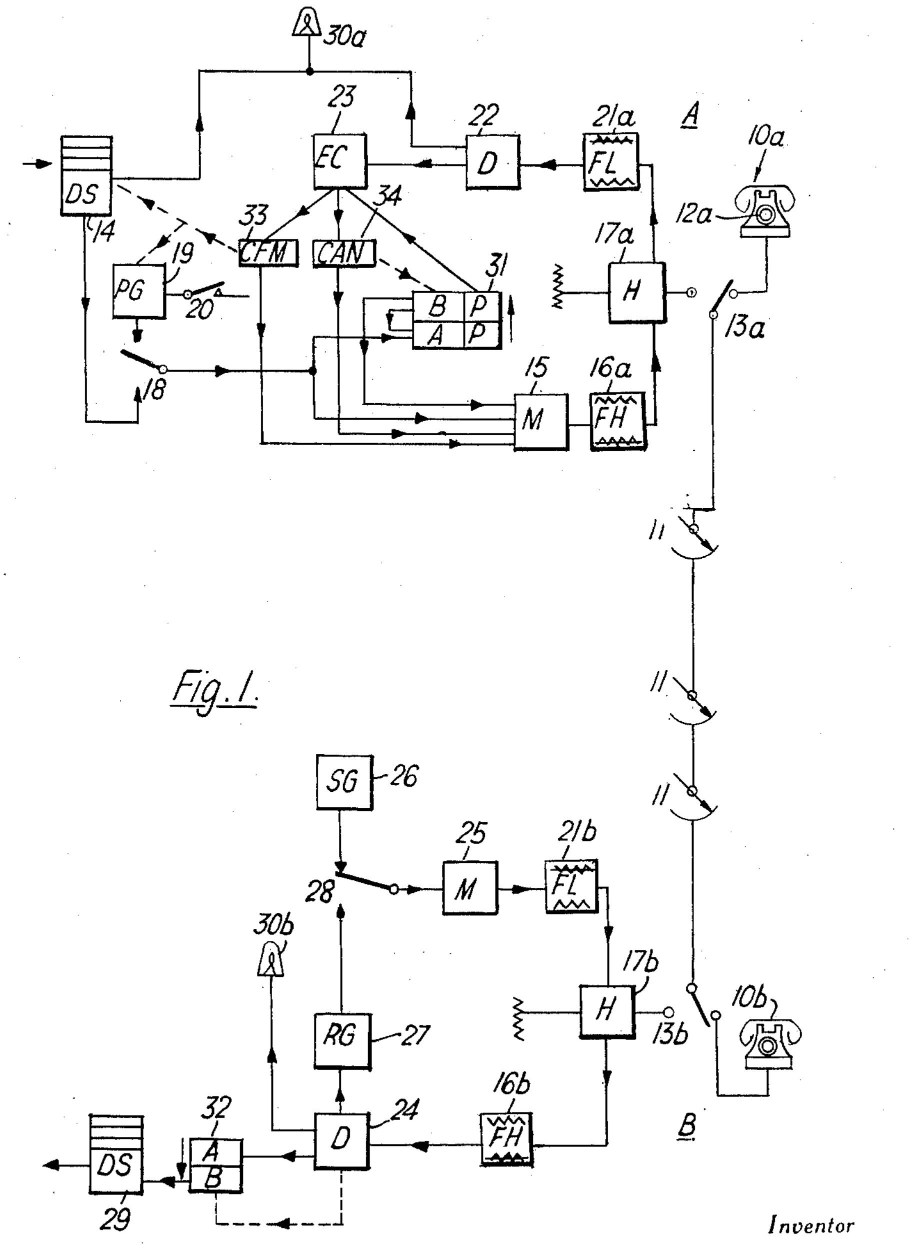
FIG. 1 is a simplified block diagram of the complete apparatus.

In FIG. 1, two sets of subscriber's apparatus A and B, each including a normal telephone subscriber's set 10*a* or 10*b*, are connected together through the telephone network by means of switches 11, of which there will, in general, by a number in tandem. A connection between the subscribers is set up in the usual way by the operation of a calling dial 12*a* (throughout this description it is assumed that subscriber A is the calling and transmitting subscriber). In due course, the call will be answered at 10*b* and subscriber A then informs subscriber B that he has data in store which it is now desired to transfer to B. At an agreed moment, keys 13*a* and 13*b* at both stations are switched over so as to transfer the connection to data storage, transmission and receiving equipemnt. It will be appreciated that the keys 13*a* and 13*b* are shown purely rudimentarily and in practice the switching would incorporate precautions to preserve the loop at each end.

The data equipment at station A includes a data store 14, the output of which is applied to a modulator 15. The resulting modulated signal is fed to line through a high-pass filter 16*a*, one path of a bybrid network 17*a*, and a contact of key 13*a*. A relay 18 can substitute a preamble generator 19, controlled by a "START" key 20, for the data store 14 as the modulator input.

The return path of the hybrid 17*a* passes through a low-pass filter 21*a* to a demodulator 22. The demodulated return signal is applied to an error checking circuit 23.

Stations A and B may comprise identical apparatus providing for transmission of data in either direction. But in the present description it is assumed that data transmission only from A to B is required and only the apparatus appropriate for this purpose is shown at each station.

Station B is thus shown as a receiving station only. The data path from its change-over key 13*b* branches through one path of a hybrid network 17*b* and through a high-pass filter 16*b* to a demodulator 24. The "return" path is fed from a modulator 25 through a low pass filter 21*b*. Th modulator 25 can receive its input alternatively from a start signal generator 26 or from a redundancy generator 27 by way of a change-over relay contact 28. The output of the demodulator 24 is applied to a data store 29, a supervisory lamp 30*b*, and the redundancy generator 27.

After change-over at station B by key 13*b* the start signal generator 26 at B transmits a characteristic signal which is demodulated at station A to generate a signal to light the supervisory lamp 30*a*. This indicates to the subscriber at station A that station B is ready to receive, relay contact 28 at B having changed-over meanwhile to connect up the redundancy generator 27 to the modulator 25 for operation on the first portion of the message (the preamble) about to be received from station A.

As the next operation, the subscriber at station A closes his start key 20 which causes the preamble generator 19 to send out (over the high frequency path) the appropriate message preamble indicating to station B the type of transmission to be expected and also including a synchronizing signal. (The details of the transmission and operation will be discussed more fully hereafter.) This preamble is demodulated at station B and causes the redundancy generator 27 to evaluate the appropriate "redundancy" which is returned to station A over the low-frequency path. The redundancy received back at station A is compared in the error checking device 23 with the value stored therein of the corresponding redundancy calculated on the outgoing message during or before transmission, the comparison serving either to confirm correct receipt at B of the preamble, or to cause it to be retransmitted from station A if in correct. If the preamble is confirmed as correct, relay 18 at station A operates to disconnect the preamble generator 19 and connect the data store 14 to the modulator 15.

Thereafter data is transmitted block by block from the store 14 at station A to the store 29 at station B, redundancy being calculated for each block in turn and stored at station A for subsequent comparison with the corresponding redundancy received back from station B.

Eventually an end-of-message code is detected which causes the supervisory lamps at both stations to glow indicating to both subscribers that the message transmission is completed.

The amount of redundancy to be transmitted over the backward channel is considerably less than the amount of data transmitted over the forward channel. A lower transmission speed can therefore be adopted for the backward direction than for the forward direction and a smaller portion of the total channel bandwidth can be allocated for backward transmission. Thus, for apparatus connected over normal switched telephone channels, as in FIG. 1, transmission in the forward direction may be effected at a speed of 500 bits per second over a sub-channel occupying the band 900 c./s. to 1900 c./s. and backward transmission may be effected at perhaps one third of the forward speed over a sub-channel occupying the band 350 c./s. to 500 c./s. Higher rates of transmission would be possible over rented channels owing to their inherently quiter nature.

"Redundancy" is a term used in the data handling art to denote additional information associated with a message but not forming part of the message or having any message signification. It is derived by a process of computation based on the content of the message. It provides a means of detecting or correcting errors which may have occurred in the handling of the message. The redundancy may take a number of forms, may be employed in a variety of ways, and has no other significance than that of detecting or correcting errors in a message. In the present instance, the system provides for the transmission of data in blocks of predetermined size and for error detection by a "parity" system—that is, by the calculation of redundancy digits from specified groups of data digits within the block at both ends of the circuit, and comparison at one of the ends of the locally derived redundancy digits with those transmitted from the other end for "parity" between them—and for error correction by retransmission of the appropriate data blocks.

Apart from a "preamble" signal and an "end-of-message" signal, the forward transmission will consist of data and supervisory signals, the latter being used either to confirm or cancel the blocks of data. The backward transmission will consist only of "redundancy" information. The forward and backward transmissions will proceed simultaneously, each over its individual sub-channel.

Consider now the data transmission system in its more theoretical aspects. At the transmitting station A the data to be transmitted is arbitrarily divided in store 14 into blocks of fixed length which do not necessarily conform to the divisions of the incoming data. The arbitrary blocks are transmitted without any other alteration than the interpolation of a supervisory (confirmation or cancellation) signal between the blocks. The blocks are, however, treated as if they had been divided into a number ("*n*") of interleaved "parity words" for each of which a parity bit is determined and recorded, together with temporary record of the data block, in a data store 31 capable of holding two whole blocks and their associated parity bits.

Table A shows the sequence of transmission of the preamble, supervisory and data blocks for a typical message of 1000 data blocks. The two preamble blocks are of the same size as the data blocks and every preamble and data block is followed by a supervisory signal.

At the receiving station the parity bits determined for each block of data received are not recorded but are transmitted over the backward channel. Here also a temporary record of the data received is retained in a data store 32 capable of holding two whole blocks.

At the transmitting station the parity bits received over the backward channel are compared in 23 with those

*Table A*

| Forward Channel | | Backward Channel |
|---|---|---|
| Block (n.k. bits) | Supy (n bits) | Redundancy (n bits) for: |
| Preamble 1 | Confirm (dummy) | Preamble 1 |
| Preamble 2 | Confirm Pre. 1 | Preamble 2 |
| Data 1 | Confirm Pre. 2 | Data 1 |
| Data 2 | Confirm Data 1 | Data 2 |
| Data 3 | Cancel Data 2, Data 3 | Data 3—not used |
| Data 2 | Confirm (dummy) | Data 2 |
| Data 3 | Confirm Data 2 | Data 3 |
| Data 4 | Confirm Data 3 | |
| . | . | . |
| . | . | . |
| . | . | . |
| Data 99 | Confirm Data 98 | Data 98 |
| Data 100 (Incomplete block:) (x message bits) (y filling bits) | Confirm Data 99 | Data 99 |
| Dummy Block: (x '1' bits) (y '0' bits) | Confirm Data 100 | Data 100 |
| End of forward signals. | | |

recorded in store 31 and from the comparison a "confirm" or "cancel" supervisory signal is prepared and held in a corresponding store 33 or 34. By reason of propagation delays over the channel and in the equipment, the supervisory signal does not immediately follow the block to which it refers but is transmitted after the end of the next block. A confirmatory supervisory signal at the receiving station will, therefore, refer to the penultimate data block stored and will release this data from the temporary store 32 into the processing equipment.

The first block of a message is invariably followed by a dummy confirmation signal referring to a hypothetical data block which has not been transmitted and, therefore, cannot include an error. At the end of a message a dummy data block must be added to precede the supervisory signal referring to the last true data block. When the end-of-message signal is recognized the dummy data block should be cancelled.

A cancellation signal received at the receiving station will also refer to the penultimate data block stored but will in this case cancel the data. In order to prepare for a repetition of a faulty block, the latest data block stored will also be cancelled without waiting to determine whether it is right or wrong. After transmitting a cancellation signal the transmitting station will retransmit the data block whose parity did not check correctly. This is followed by a repetition-of-block signal and the next data block. Then will follow the normal confirmation or cancellation signal referring to the first of the retransmitted blocks and so on. The parity bits received during the repetition of the faulty block will be disregarded. In Table A, it is assumed that faulty transmission of Data Block 2 has occurred.

Some aspects of operation of the equipment will now be described in rather more detail. At the transmitting station A each block fed to the modulator 15 for transmission, either from the preamble generator 19 or from the store 14, is simultaneously fed into stage A of the two block temporary store 31, the block previously occupying stage A having been shifted into stage B. It is assumed that the store 31 also serves to determine the parity bits for each block and to store them at P.

Similarly at the receiving station B the incoming block is stored in stage A of the temporary store 32, the block previously stored therein having been shifted into stage B.

Simultaneously with transmission of one block the redundancy for the preceding block is being transmitted in the backward direction from the redundancy generator 27 of station B. After demodulation in station A the redundancy signals are compared in the error checking circuit 23 with the bits held for the corresponding block in stage B of temporary store 31. If the two sets of bits are in agreement, a "confirm" signal is generated and held in its store 33 for application to the modulator 15, and thence to line, after the completion of the transmission of the current block. Simultaneously a permissive signal is applied to the store 14 (or to preamble generator 19, if appropriate) to release the next successive block for transmission.

If the checking of the redundancy bits shows that a transmission error has occurred, the "cancel" output of circuit 23 is energized. This applies a "cancel" signal from store 34 to the modulator for transmission and also applies a permissive signal to the temporary store 31 to release the two blocks stored therein for transmission in their correct order. During transmission these blocks are re-written into the temporary store in order to cater for a further possible re-transmission.

At the receiving station B each successive block is stored first in stage A of store 32 and then shifted to stage B. The arrival over the line of a confirmatory signal, which will relate to the next to last block received, is effective to release this block from stage B of the temporary store to the final store 29. A cancel signal cancels the blocks in both stages of the store and leaves the store ready for receiving the re-transmitted blocks.

It will be understood that the units which form the apparatus shown in the drawings are represented by function alone, since their construction and method of operation is well known to workers in this field. The present invention resides primarily in the mode of operation of the apparatus as a whole and not in the constructional and operational details of the individual units.

During transmission, the parity bit for each parity word is calculated by binary counters at both the transmitting and receiving stations. These parity bits become available progressively at the transmitting station as the last $n$ data bits of the block are transmitted and at the receiving station as these same bits are received. The number of bits ($k$) in a parity word determines (inversely) the proportion of redundancy to data, but it should not be made too large because so doing increases the risk of undetected errors. The number of parity words ($n$) in a data block determines the separation between bits in a parity word. If too small, it will increase the danger that a single burst of interference may cause a combination of errors which pass undetected.

The number of bits per data block ($nk$) needs to be as small as possible in order to keep down the cost of the stores and other equipment, but the minimum acceptable data block size is influenced by the need to avoid waiting times associated with the "restitution" delays in the transmission terminal equipment and with the propagation times for the signals over the telephone line in both the forward and backward direction. This is discussed again later in an actual calculation of the block size. In this calculation also, it is indicated that, for a rented telephone line whose propagation times do not exceed 20 milliseconds in each direction and with a forward) modulation rate of 900 bits per second, the preferred values for the block size and number of parity bits are as given in Table B.

*Table B*

| | | | |
|---|---|---|---|
| $n=6$ | 7 | 8 | parity words. |
| $k=9$ | 8 | 8 | bits per parity word. |
| $nk=54$ | 56 | 64 | bits per data block. |

A similar block size can also be used for switched connections with a (forward) modulation rate of 500 bits per second, but circumstances may arise in which the greater economy of a smaller block is desirable.

If error detection is not necessary, the redundancy equipment will be switched off manually at the transmitting station. This will automatically change the preamble sent out before date transmission commences indicating to the receiving station that transmission of redundancy is not required and that the received data may immediately be passed on for processing.

The supervisory signals may each comprise 6 bits, appropriately coded, and a preamble signal may be one block of 01010101 . . . 01 followed by one block of 00110011 . . . 11 separated by the confirmation signal.

The preamble signal may be used initially for the synchronization of receiving equipment and, if properly recognized by the receiver, will induce the return of the appropriate redundancy. The latter, if correctly received at the transmitting station, will then give an indication (e.g. a green lamp) and cause the transmission of a further confirmation signal and the commencement of the data transmission.

The end-of-message condition will be indicated by the special supervisory signal and confirmed by the removal from the line of tone transmitted in the forward direction. This change of state will be recognized at the receiving station after a delay which is sufficient to avoid false indication of the end-of-message condition due to line noise.

It is possible that the receiving station may be attended or unattended. In either case it is assumed that there will be a verbal announcement before the data apparatus is connected and that this announcement will be terminated by a signal comprising approximately 50 0's. A lamp or other signal at the transmitting station can therefore be introduced to show when the receiving station is ready.

Figure 2:
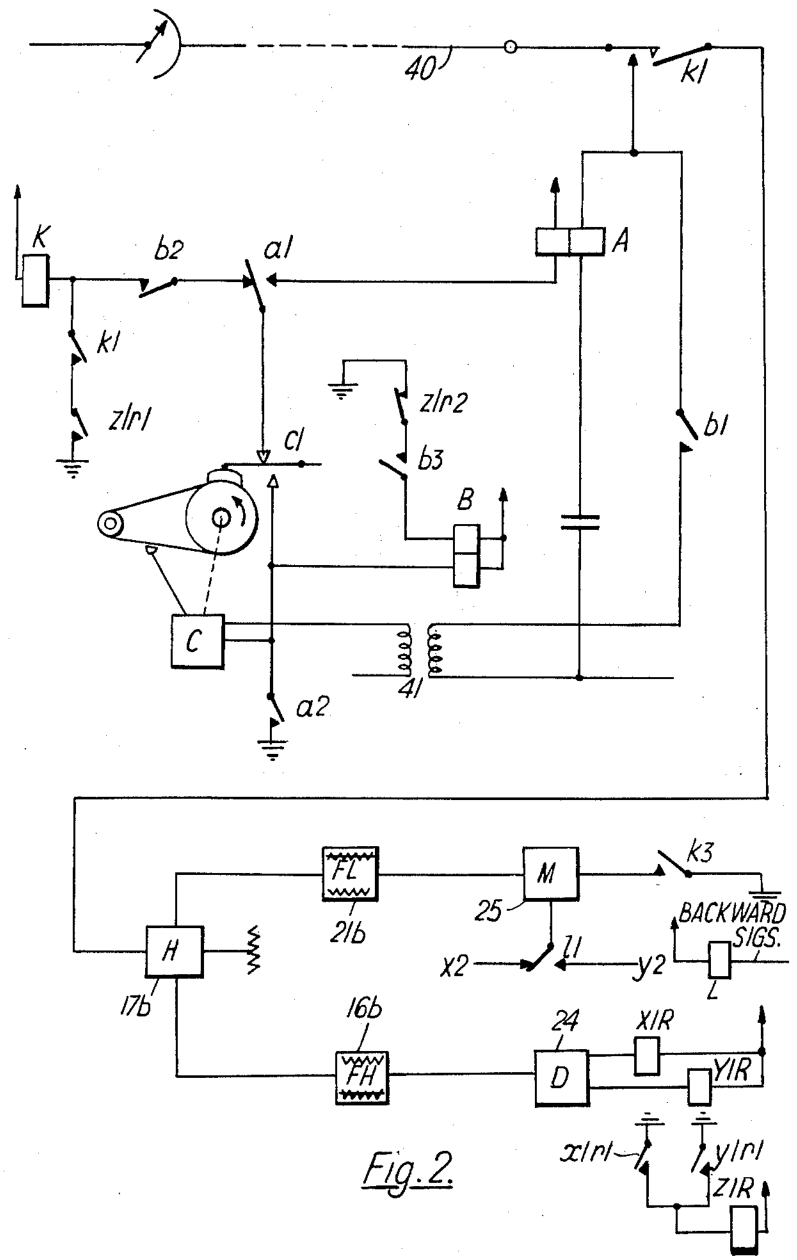
FIG. 2 is a logic diagram illustrating in more detail the operation of the apparatus.

FIG. 2 shows a modified arrangement of the receiving station B which permits unattended operation of that station. In this figure the 2-wire line is represented by a single conductor 40 passing through the exchange and the make-before-break contact *k1* of relay K corresponding to the changeover key 13*b* of FIG. 1. When the line is called the A.C. ringing current operates relay A over the loop. Contacts *a1* close the locking circuit of relay A. Contacts *a2* start up a verbal announcement machine C which can be a magnetic tape and head or a film and light cell device of known design. A cam on the flange of the wheel carrying the tape (or film) operates a set of contacts $c1$ when rotation commences. As a consequence the locking winding of A is opened and A releases, but the announcing machine circuit is maintained independent of $a2$. Relay B operates through $c1$. Its contacts $b1$ in closing completes an A.C. path across the loop at the receiving station short circuiting the winding of relay A and thus making a reply. The new path contains one winding of transformer 41 over which the vocal announcement is transmitted to the sending station. When the machine completes its announcement the spring $c1$ returns to normal and the machine drive is interrupted. Relay K operates and the incoming loop is switched to hybrid 17*b* and the two band-pass filters 16*b* and 21*b*. The contacts $k3$ start up the return modulator 25 which includes two oscillators representing X2 and Y2, the two signal frequencies used in the backward direction, and a third oscillator which is designed to operate at the baud speed of the channel. As the signalling relay L is unoperated the modulator transmits the X2 frequency to line as a start signal. During normal transmission, signals in the forward direction operate the receiving relays X1R and Y1R sequentially. Both these relays operate the slow-to-release relay Z1R whose contact $z1r2$ opens the locking winding of relay B which now releases. The maintenance of the changeover relay K is now dependent on $z1r1$ remaining closed. The end of message is signalled by the absence of forward signals which after a short delay causes Z1R and K to release. When relay K releases the D.C. loop at the received station is opened by $k1$ so that the conditions will be identical to those given by an operator in replacing the receiver.

It has been explained that the supervisory signal transmitted in the forward direction to announce whether the redundancy for a data block is correct will not immediately follow the relevant data block but will follow the subsequent data block, thereby leaving approximately the emission time of one data block for the process of determining the redundancy and for the propagation delays.

If the time available is considered in more detail, it will be appreciated that after each data block there is emitted a supervisory signal which may comprise 6 bits, so that the cycle time for one data block and one supervisory signal will be the emission time of $(nk+6)$ bits. Furthermore, it will be appreciated that at the receiving station the determination of the redundancy cannot commence until the last bit of the first parity word has been received. This bit will received $n$ bits before the end of the data block. At the transmitting station, it is necessary to complete the redundancy comparison before the subsequent data block is completely transmitted. The significant interval to be considered at the transmitting station will, therefore, be from the time the last bit of the first parity word is emitted until the completion of the next data block. This period will be the emission time of $(nk+6)$ bits plus the emission time of $n$ bits representing the last bit of each parity word. Hence, the total interval will be the time needed to emit $(n(k+1)+6)$ bits.

During this time it is necessary to make estimated allowances for the operations listed in Table C.

*Table C*

| | |
|---|---|
| Propagation in the forward direction through the line, typically ---milliseconds-- | 20 |
| Total of restitution delays of the forward signals through both transmitting and receiving equipments ---bits-- | 3 |
| Time for emitting the $n$ bits of redundancy at a speed of one third of the modulation rate for the data ---bits-- | $3n$ |

*Table C*—Continued

| | |
|---|---|
| Propagation time for redundancy in the return direction through the line ---milliseconds-- | 20 |
| Total of restitution delays of the redundancy in the backward direction through both transmitting and receiving equipments ---bits-- | 9 |
| Total time: $3n+12$ bits$+40$ milliseconds. | |

Hence $n(k+1)+6$ bits $3n+12$ bits$+40$ milliseconds
$n(k-2)-6$ bits 40 milliseconds.

At 900 bits per second each bit needs 10/9 milliseconds while at 500 bits per second each bit needs 2 milliseconds.

Taking the values of $n$ as 6, 7 and 8 the resulting values of $k$ for the two different bit rates are shown in Table D.

*Table D*

| | $n=6$ | 7 | 8 |
|---|---|---|---|
| At 900 bits per second ---$k=$ | 9 | 8 | 8 |
| At 500 bits per second ---$k=$ | 7 | 6 | 6 |

There is one point that requires some consideration here. Incoming data is divided arbitrarily into blocks each of about 50 bits, but in many applications the data to be transferred will not comprise a whole number of blocks, the last block being incomplete. The block is, therefore, filled with "dummy" data and the problem arises of distinguishing the end of data and the commencement of filling.

It is proposed to take advantage of the intention to terminate the message with a "dummy" block which precedes the supervisory signal of the last true data block. This fictitious block can be made to comprise a pattern in which the bit positions occupied by 1's indicate the data positions in the last block whereas the bit positions occupied by 0's indicate the filling. Table A indicates this process.

In the foregoing, we have described an economical medium-speed data transmission system operating in the duplex mode and suitable for use on rented or switched 2-wire circuits. The system incorporates automatic error correction by retransmission of the blocks of data concerned.

Special features of the system are the use of different speeds for transmission of data and of redundancy and the use for synchronization of the preamble and supervisory signals.

Somewhat easier transmission conditions are present if no error detection or correction is needed. On the other hand, much more difficult transmission conditions may be experienced if data is required to be switched over a network which includes echo suppressors. The receiving station will normally be attended so that the incoming lines can be used for telephony and telegraphy, but it is possible to use an unattended condition especially during the night.

If no automatic error detection or correction is necessary, a special preamble signal is chosen which, on being decoded, will serve to initimate to the receiving station that redundancy need not be calculated and transmitted and that no retransmissions are required. As a consequence the data may be more rapidly transferred, since temporary storage is unnecessary.

In general, neither the transmitting nor the receiving station will be aware when an echo suppressor is included in a switched connection over the ordinary telephone network. However, the presence of an echo suppressor will result in extra delay before redundancy commences to arrive back at the transmitting station. As a consequence the transmitting station may be arranged to recommence the data transmission by using a special preamble signal which instructs the receiving station to delay the backward transmission of redundancy long enough to cover the delay of the echo suppressor. As a consequence, the effective speed of data transfer is greatly reduced, but it is expected that switched connections will only very infrequently include echo suppressors.

The data receiving equipment can be disconnected either as the result of an end-of-message signal after two or more confirmation signals, or as the result of the absence of signal tone for longer than a set period of time. When the receiving equipment is disconnected a warning tone will be applied for a short period and after this the loop for the direct current will be opened.

A further feature of the system above outlined is the facility of using various forms of preamble to select different forms of reception by automatic changes of control.

It is to be understood that the foregoing description of specific examples of this invention is not to be considered as a limitation on its scope.

What we claim is:

1. Apparatus for intelligence transmission comprising:
a single communication channel of limited frequency bandwidth;
first and second terminal equipment coupled to opposite ends of said channel for simultaneous intelligence transmission in both directions over said channel; and
means disposed in each of said terminal equipments to divide the bandwidth of said channels into two sub-channels of unequal bandwidth, one of said sub-channels being allocated for transmission in one direction over said channel and the other of said sub-channels being allocated for transmission in the opposite direction over said channel;
said first terminal equipment including first transmitting means coupled to said one of said sub-channels for transmitting message intelligence;
said second terminal equipment including second transmitting means coupled to said other of said sub-channels for transmitting supervisory intelligence;
said terminal equipment including means for checking said message intelligence for errors occurring in transmission in response to said message intelligence and said supervisory intelligence.

2. Apparatus according to claim 1, wherein:
said first terminal equipment includes means for dividing said message intelligence into a series of blocks of fixed arbitrary length; and
said means for checking checks each block successively.

3. Apparatus according to claim 2, wherein said means for checking checks for transmission errors in a given block during transmission of the next successive block.

4. Apparatus according to claim 3, wherein said first terminal equipment includes:
first storage means for the last two blocks transmitted over said channel, said two clocks stored in said first storage means being retransmitted when said means for checking detects an error in the first two said two stored blocks.

5. Apparatus according to claim 4, wherein said second terminal equipment includes:
second storage means for the last two blocks received over said channel, said two blocks stored in said second storage means being cancelled when said means for checking detects an error in the first of said two stored blocks.

6. Apparatus according to claim 5, wherein said means for checking includes:
means disposed in said first terminal equipment to determine the correct transmission of a given block and to supply a supervisory signal for transmission after the next successive block to either release said given block from said second storage means or cancel both said given block and said next successive block from said second storage means.

7. Apparatus according to claim 2 wherein said first terminal equipment includes:
means for determining when the last block of a transmission is not completely filled by the available message intelligence and for filling the incomplete block.

8. Apparatus according to claim 7, wherein said first terminal equipment includes:
means to produce an additional block having a predetermined composition to indicate the portion of said last block containing message intelligence for transmission after said last block.

9. Apparatus for intelligence transmission comprising:
a single communication channel of limited frequency bandwidth;
first and second terminal equipment coupled to opposite ends of said channel for simultaneous intelligence transmission in both directions of said channel;
means disposed in each of said terminal equipments to divide the bandwidth of said channel into two sub-channels of unequal bandwidth, one of said sub-channels being allocated for transmission in one direction over said channel and the other of said sub-channels being allocated for transmission in the opposite direction over said channel;
a telephone subset associated with each of said terminal equipments;
switching means associated with each of said terminal equipments to selectively connect said subset and said terminal equipment to the associated end of said channel; and
said switching means associated with said second terminal equipment includes means activating said switching means automatically to connect said second terminal equipment to the associated end of said channel in response to a signal received over said one of said sub-channels indicating the imminence of intelligence transmission.

10. Apparatus for intelligence transmission comprising:
a single communication channel of limited frequency bandwidth;
first and second terminal equipment coupled to opposite ends of said channel for simultaneous intelligence transmission in both directions over said channel;
means disposed in each of said terminal equipments to divide the bandwidth of said channel into two sub-channels of unequal bandwidth, one of said sub-channels being allocated for transmission in one direction over said channel and the other of said sub-channels being allocated for transmission in the opposite direction over said channel;
a telephone subset associated with each of said terminal equipments; and
switching means associated with each of said terminal equipments to selectively connect said subset and said terminal equipment to the associated end of said channel;
said switching means associated with said second terminal equipment including means activating said switching means automatically to connect said second terminal equipment to the associated end of said channel in response to a signal received over said one of said sub-channels indicating the imminence of intelligence transmission; and
said second terminal equipment including means responsive to the operation of said activating means to transmit a signal over said other of said sub-channels to indicate the readiness of said second terminal equipment to receive intelligence transmission.

11. Apparatus according to claim 10, wherein said first terminal equipment includes:
means responsive to said signal transmitted over said other of said sub-channels to initiate intelligence transmission by said first terminal equipment over said one of said sub-channels.

(References on following page)

References Cited by the Examiner

UNITED STATES PATENTS

| | | | |
|---|---|---|---|
| 1,984,099 | 12/1934 | Viard | 179—3 |
| 2,077,899 | 4/1937 | Roseby | 179—3 |
| 2,722,682 | 11/1955 | Neiswinter | 343—179 |
| 2,974,281 | 3/1961 | Feldman | 179—2 |

FOREIGN PATENTS

| | | |
|---|---|---|
| 622,968 | 5/1949 | Great Britain. |
| 976,792 | 3/1951 | France. |

DAVID G. REDINBAUGH, *Primary Examiner.*

L. MILLER ANDRUS, *Examiner.*